United States Patent
Park

(10) Patent No.: US 7,258,028 B2
(45) Date of Patent: Aug. 21, 2007

(54) LOAD MEASURING TRANSDUCER INCLUDING ELASTIC STRUCTURE AND GAUGE USING INDUCED VOLTAGE, AND LOAD MEASURING SYSTEM USING THE SAME

(76) Inventor: Hueng Joon Park, 103-1601 Hanshin apt., Jookjeon, Yongin-shi, Gyunggi-do 449-160 (KR)

( * ) Notice: Subject to any disclaimer, the term of this patent is extended or adjusted under 35 U.S.C. 154(b) by 231 days.

(21) Appl. No.: 10/537,403

(22) PCT Filed: May 10, 2004

(86) PCT No.: PCT/KR2004/001076

§ 371 (c)(1),
(2), (4) Date: Jun. 1, 2005

(87) PCT Pub. No.: WO2005/015137

PCT Pub. Date: Feb. 17, 2005

(65) Prior Publication Data

US 2006/0081072 A1    Apr. 20, 2006

(30) Foreign Application Priority Data

Aug. 12, 2003  (KR) ...................... 10-2003-0055816
Sep. 9, 2003   (KR) ...................... 10-2003-0063145
Sep. 9, 2003   (KR) ...................... 10-2003-0063164

(51) Int. Cl.
*G01L 1/10* (2006.01)
(52) U.S. Cl. ................................. 73/862.625
(58) Field of Classification Search ..............
73/862.61–862.69, 862.625
See application file for complete search history.

(56) References Cited

U.S. PATENT DOCUMENTS

| | | | |
|---|---|---|---|
| 3,202,948 A | | 8/1965 | Farrand |
| 3,827,291 A | | 8/1974 | McCalvey |
| 4,521,685 A | * | 6/1985 | Rebman ...................... 250/229 |
| 4,572,006 A | * | 2/1986 | Wolfendale ............ 73/862.626 |
| 4,649,759 A | * | 3/1987 | Lee ........................ 73/862.626 |
| 5,129,262 A | * | 7/1992 | White et al. .................. 73/599 |
| 5,492,020 A | * | 2/1996 | Okada ................... 73/862.626 |
| 5,497,668 A | * | 3/1996 | Okada ................... 73/862.626 |

(Continued)

OTHER PUBLICATIONS

H. Wakiwaka et al., "Analysis of Impedance Characteristics of Meander Coil" IEEE Transactions on Magnetics, IEEE Service Center, New York, NY, US, 32(5): 4332-4334, XP000634005, ISSN: 0018-9464, Sep. 1995 (Abstract).

(Continued)

*Primary Examiner*—Max Noori
(74) *Attorney, Agent, or Firm*—McDermott Will & Emery LLP

(57) ABSTRACT

The present invention relates to a load measuring transducer including gauges and elastic structure and weighing system for measuring weight applied to a structure. The load measuring transducer of the present invention comprises a stationary gauge which is constructed of a plurality of repeated coil (or electric wire) patterns with a predetermined pitch and has both ends to which an AC electricity is applied; and a moving gauge which is provided to move in a longitudinal direction (or perpendicular direction with respect to the longitudinal direction) of the stationary gauge without contact therewith in response to the occurrence of the elastic deformation of the deformation-producing portion of the structure of the transducer.

22 Claims, 17 Drawing Sheets

U.S. PATENT DOCUMENTS

| | | | |
|---|---|---|---|
| 6,532,824 B1 * | 3/2003 | Ueno et al. | 73/780 |
| 6,675,656 B1 * | 1/2004 | Plochinger | 73/718 |
| 6,705,166 B2 * | 3/2004 | Leonardson | 73/514.32 |
| 6,865,960 B2 * | 3/2005 | Doemens et al. | 73/862.626 |
| 6,910,379 B2 * | 6/2005 | Eskridge et al. | 73/504.14 |
| 7,069,784 B1 * | 7/2006 | Eskridge | 73/514.29 |
| 2002/0189355 A1 | 12/2002 | Leonardson | |

OTHER PUBLICATIONS

European Search Report issued in corresponding European Patent Application No. 04732052.8-1236, dated Apr. 12, 2007.

* cited by examiner

[FIG 1]
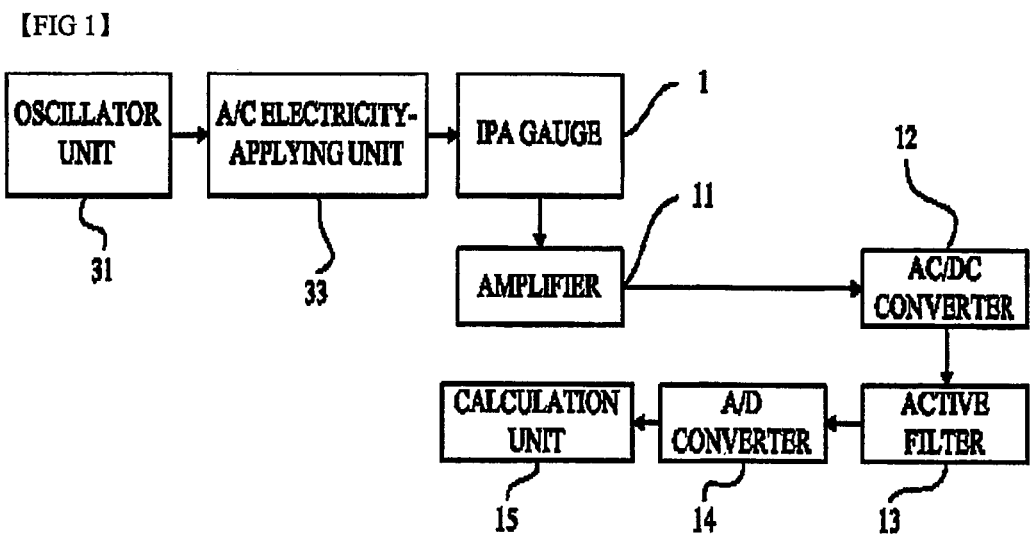

[FIG 2]
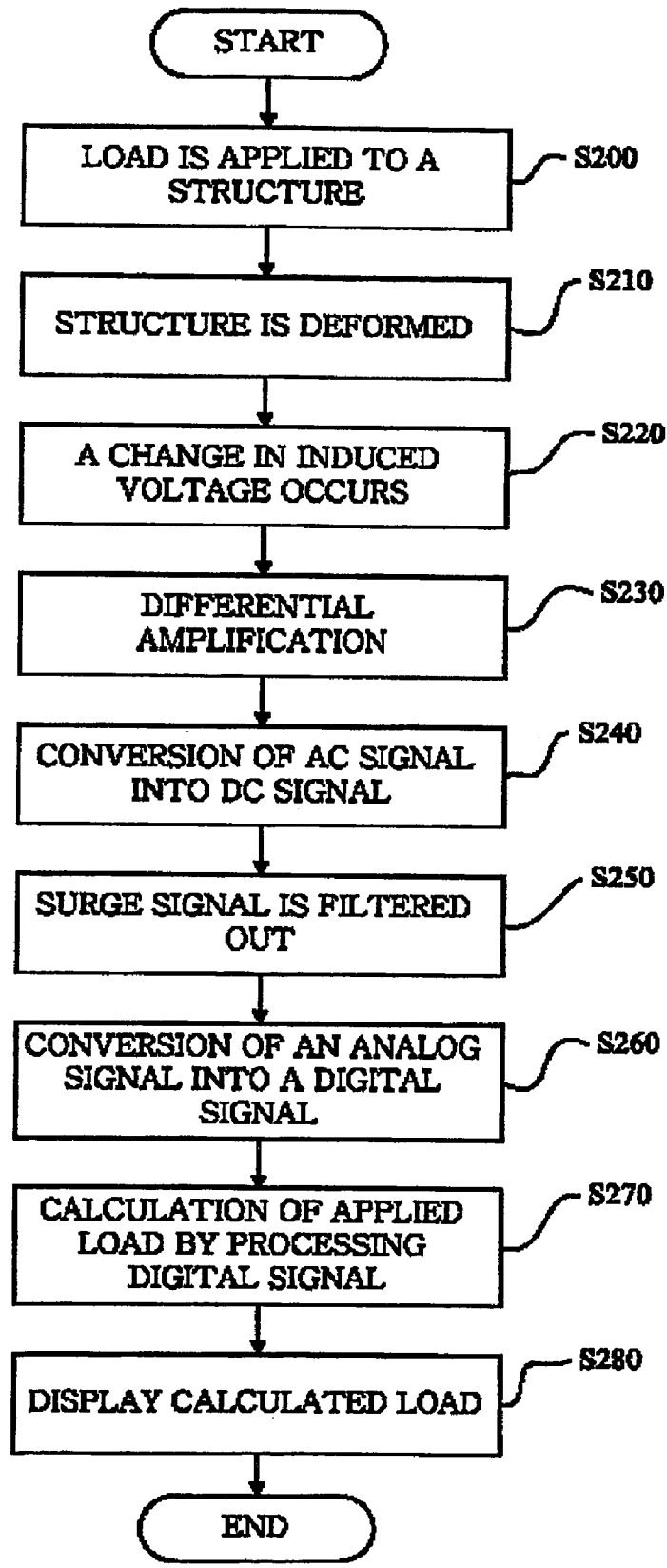

【FIG 3】
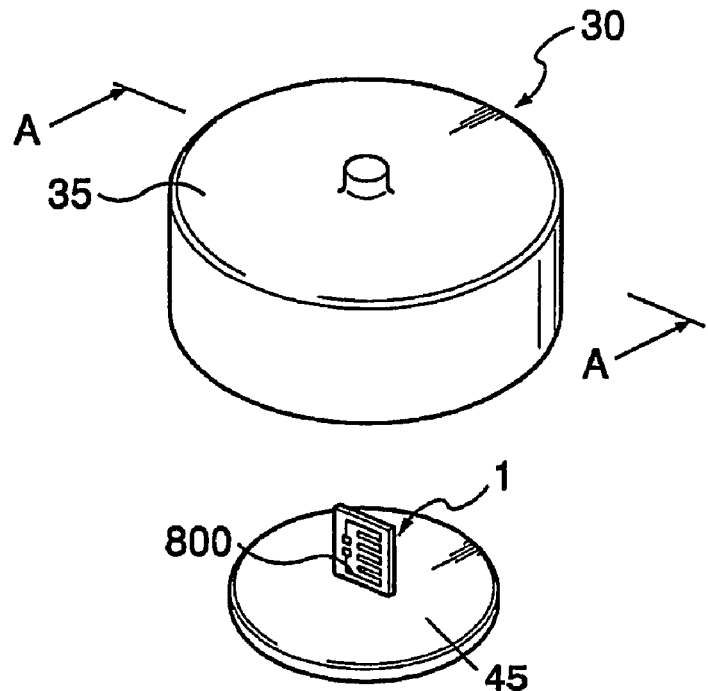
【FIG 4】
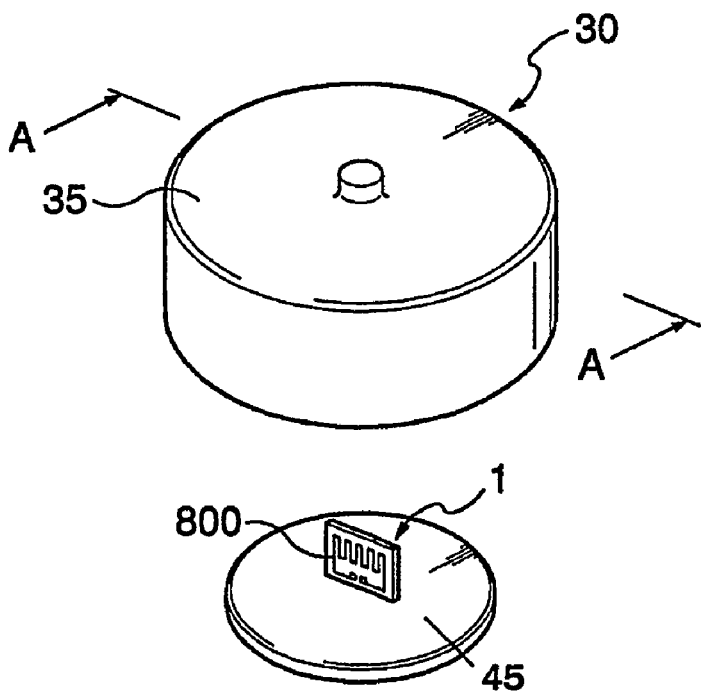

[FIG 5]
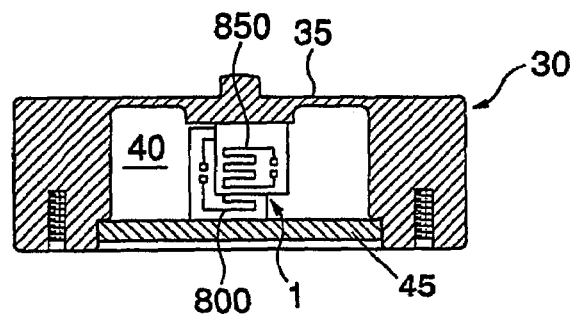
[FIG 6]
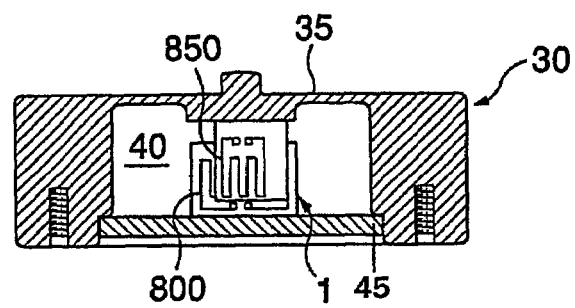
[FIG 7]
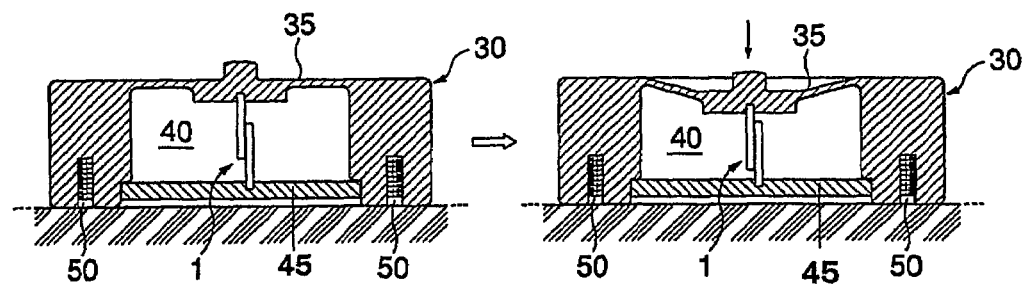

[FIG 8]
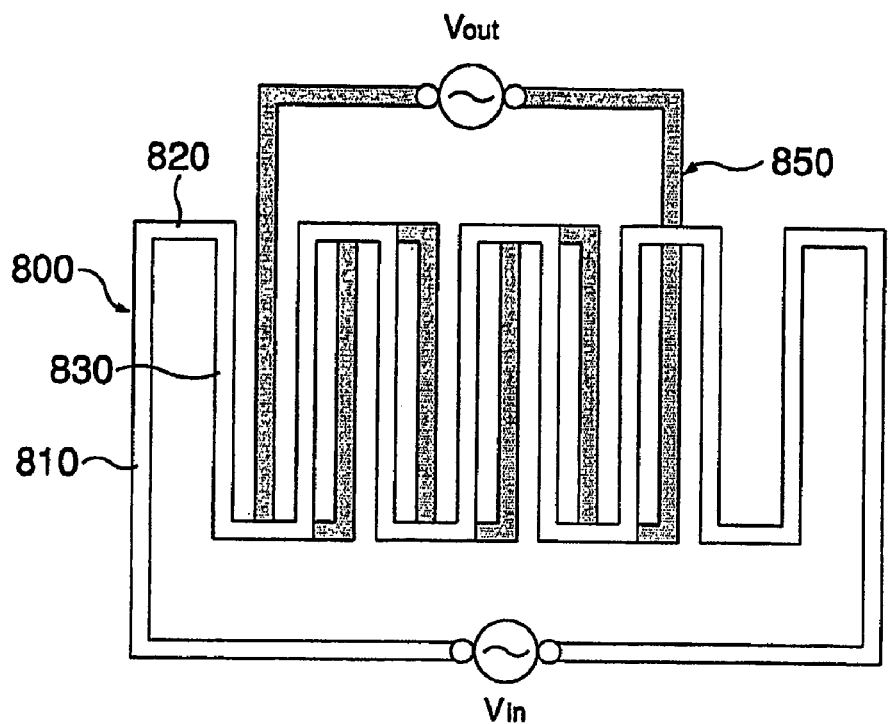
[FIG 9]
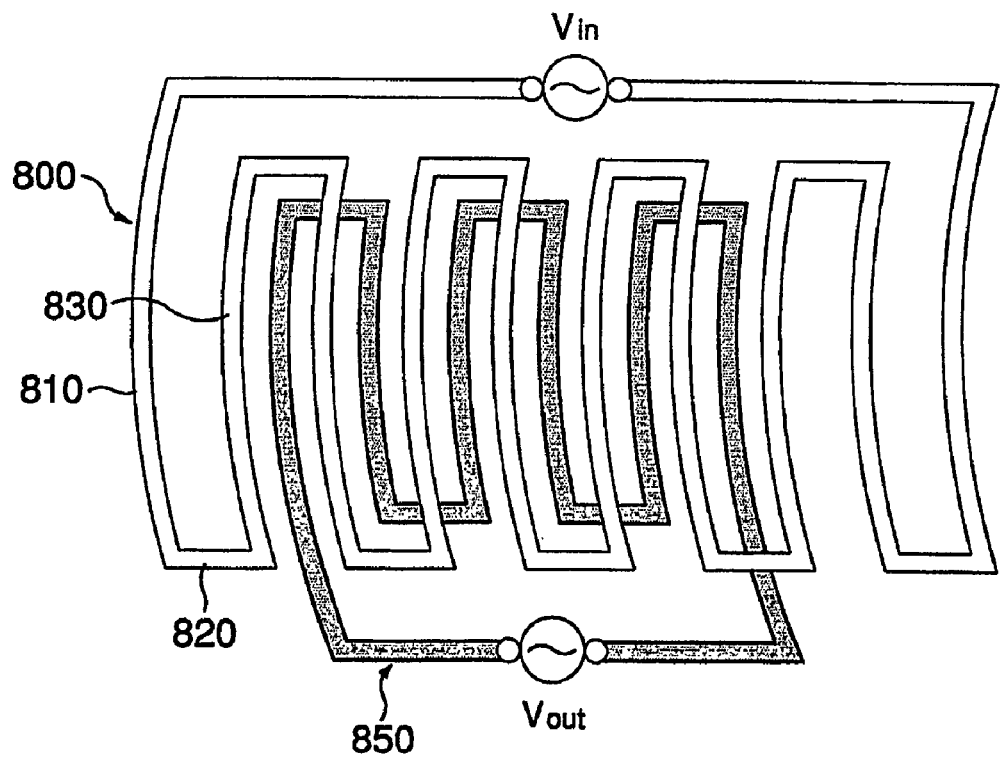

[FIG 10]
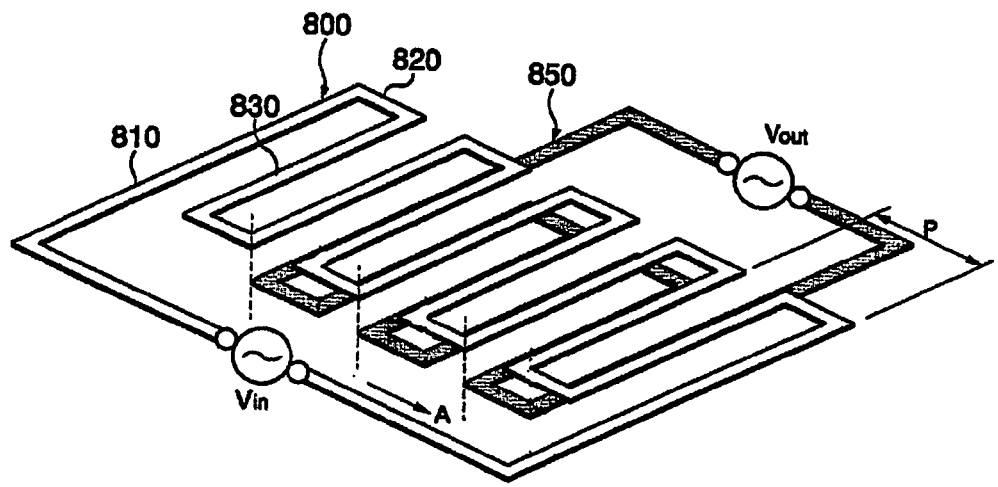
[FIG 11]
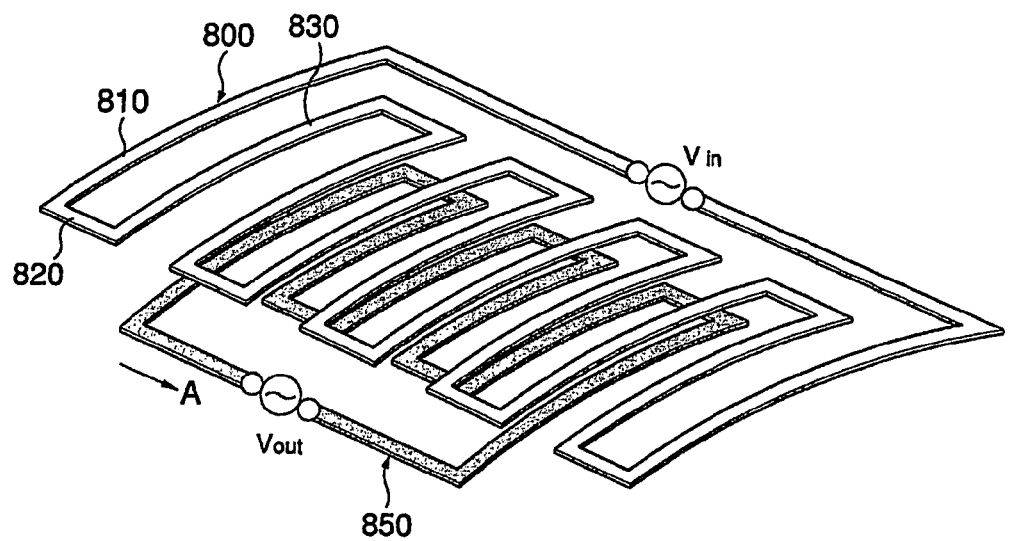

[FIG 12]
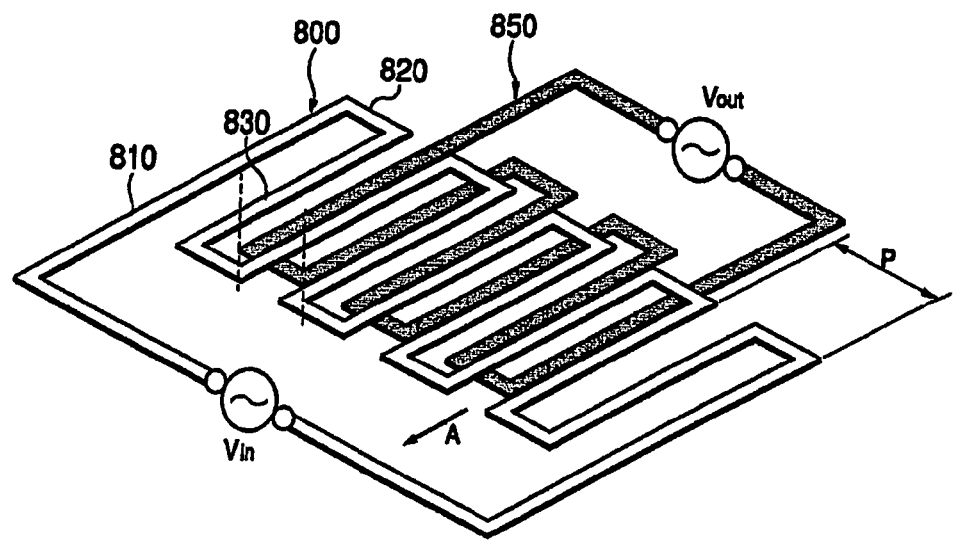
[FIG 13]
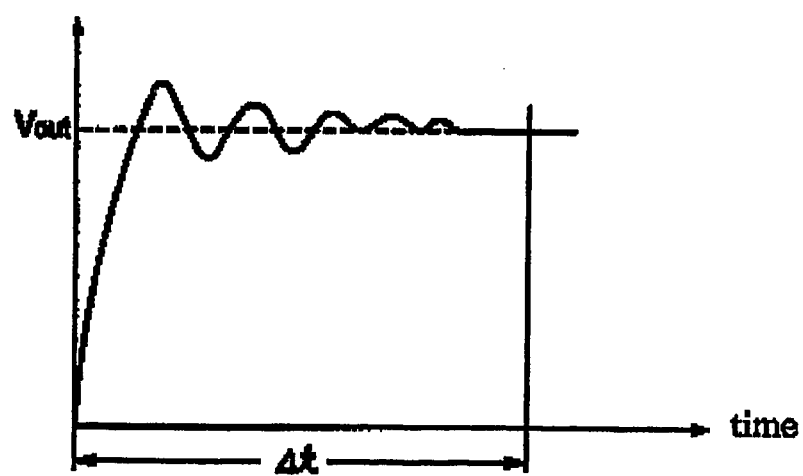

[FIG 14]
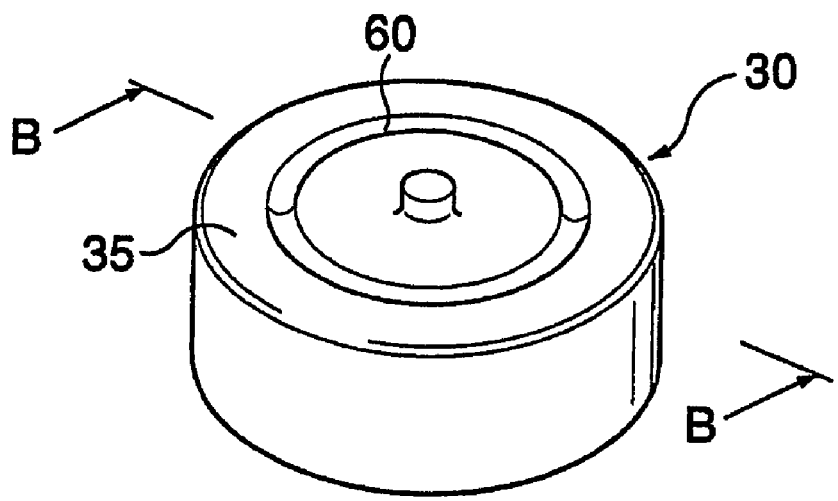
[FIG 15]
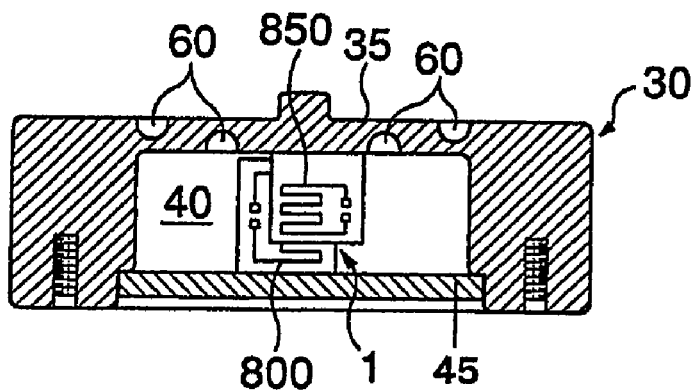

[FIG 16]
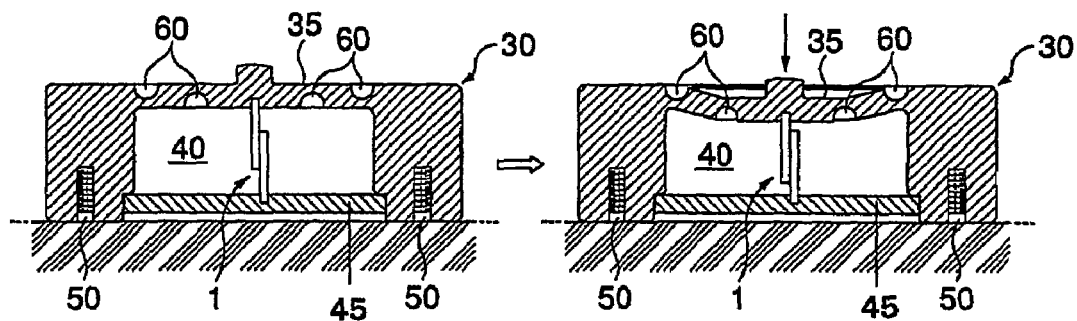
[FIG 17]
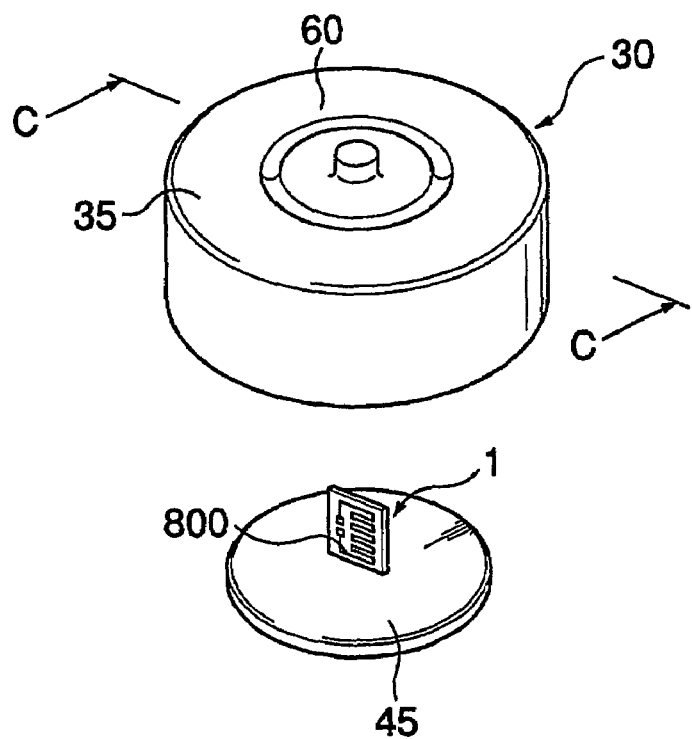

[FIG 18]
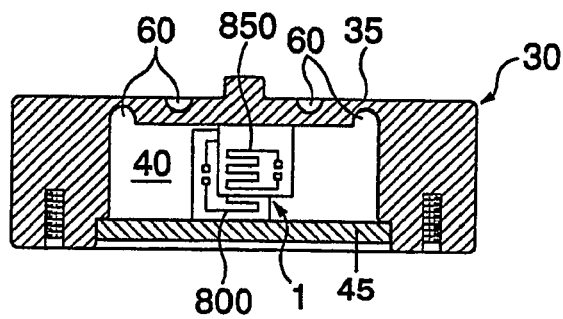
[FIG 19]
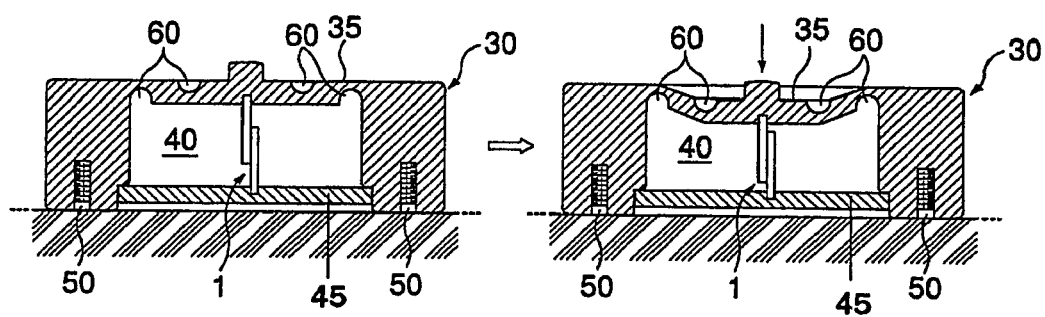
[FIG 20]
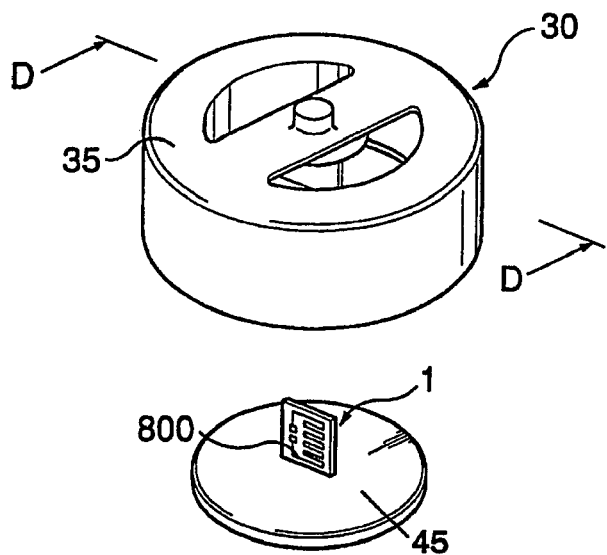

[FIG 21]
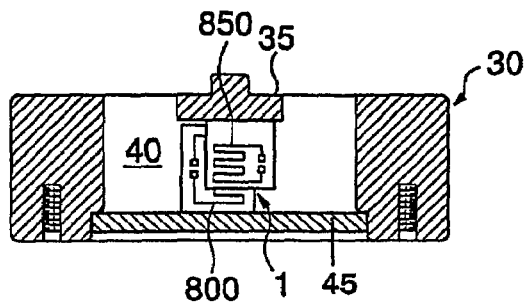
[FIG 22]
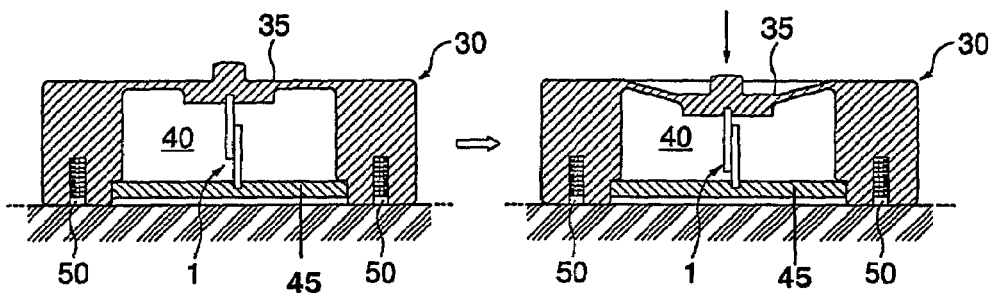
[FIG 23]
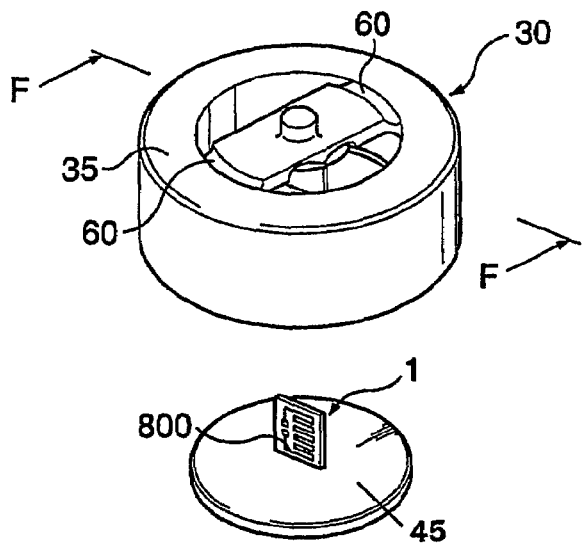

[FIG 24]
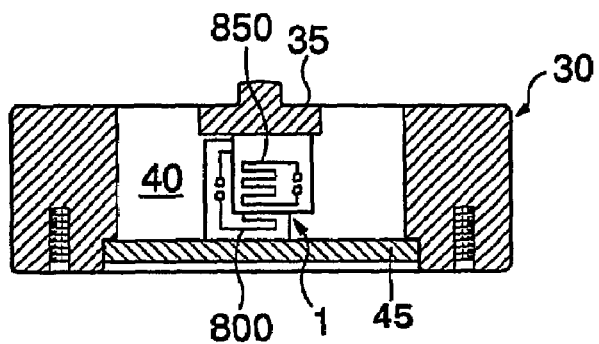
[FIG 25]
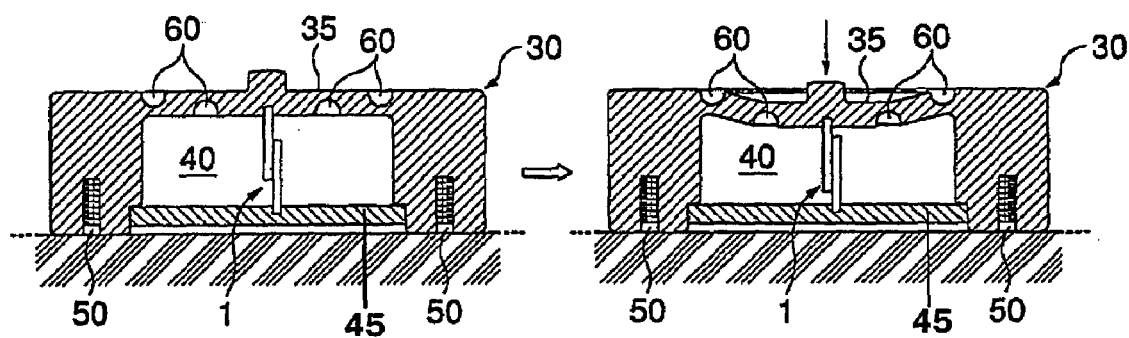

[FIG 26]
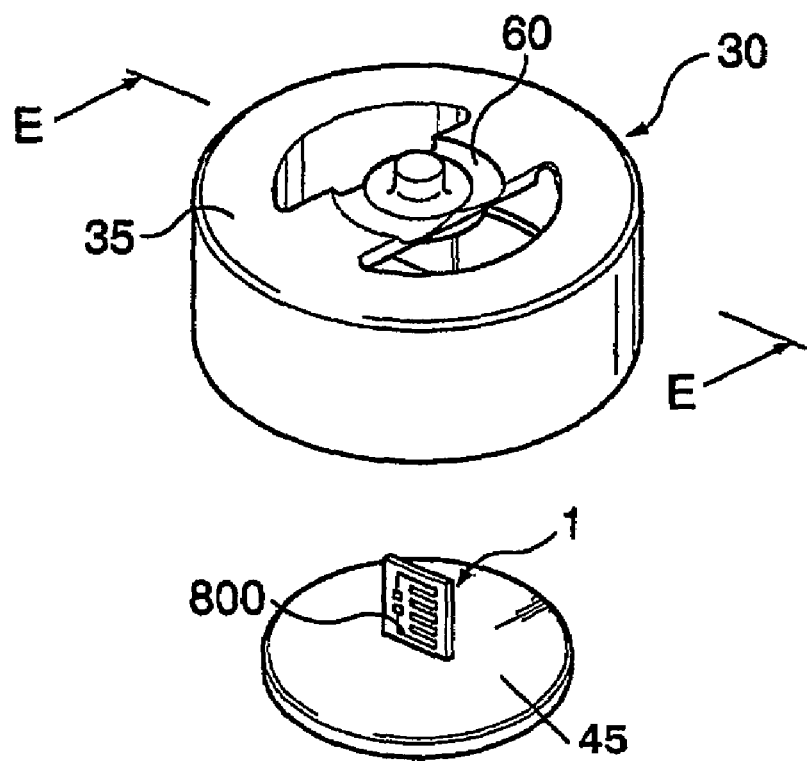
[FIG 27]
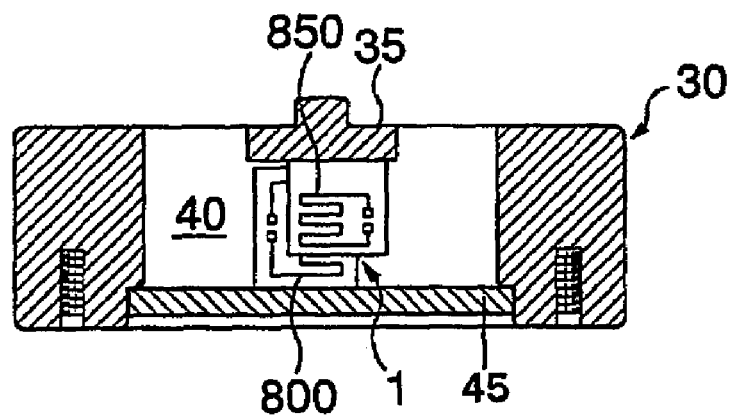

[FIG 28]
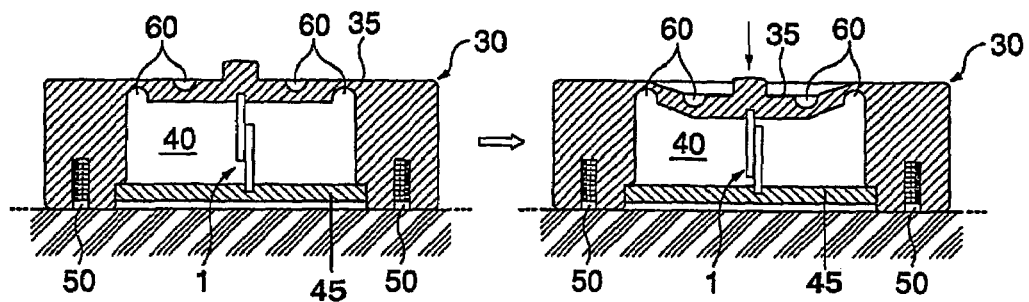
[FIG 29]
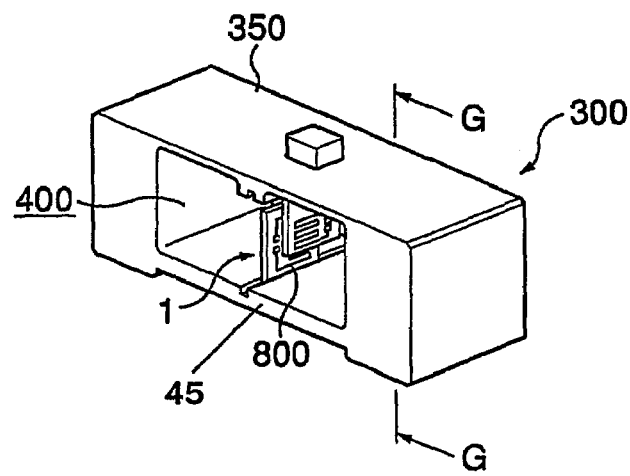

[FIG 30]
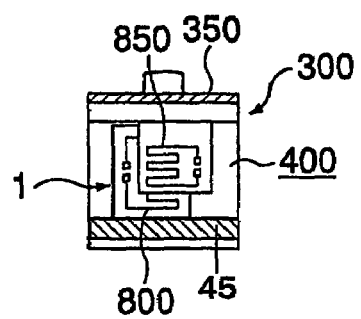
[FIG 31]
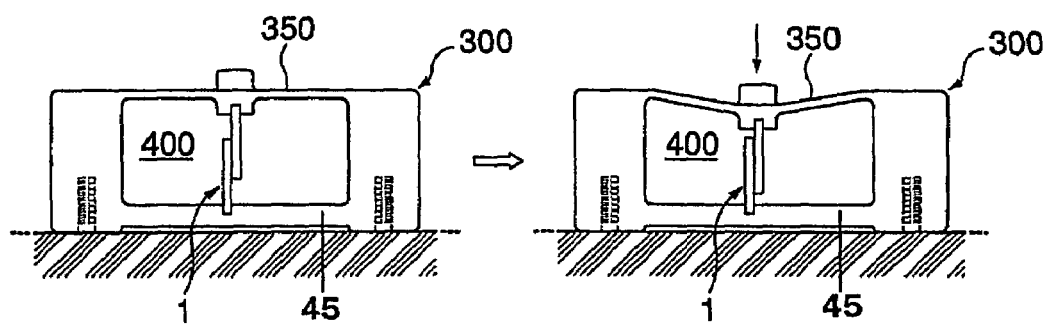

[FIG 32]
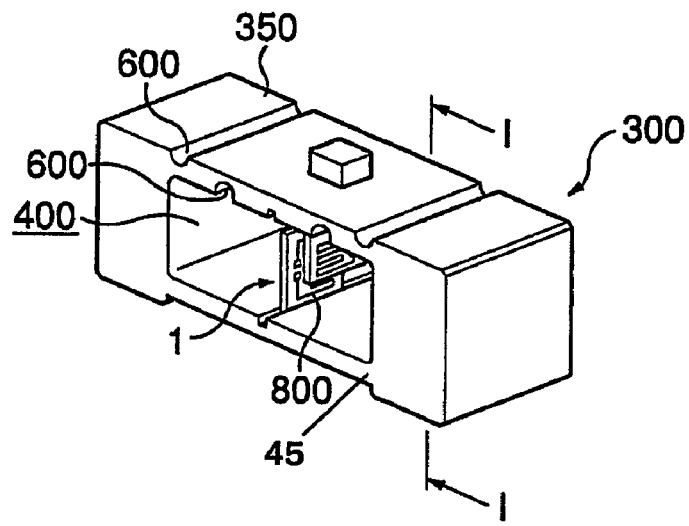
[FIG 33]
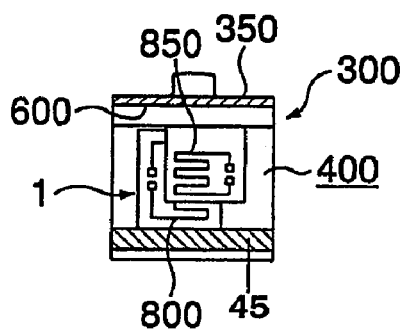
[FIG 34]
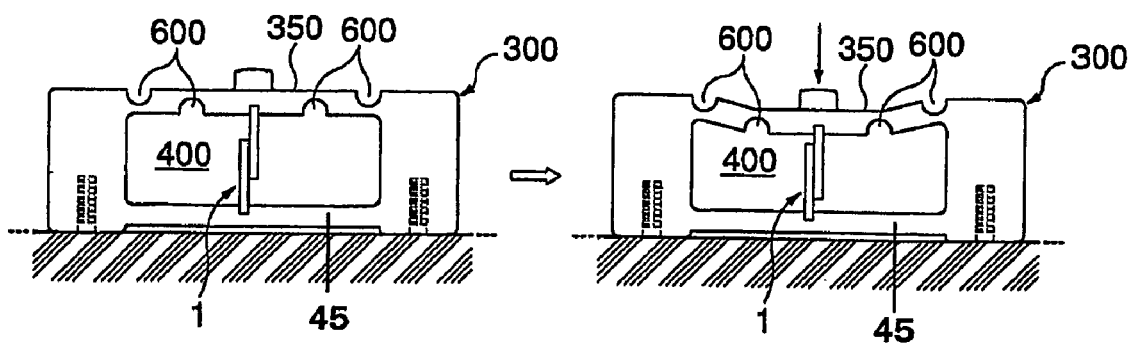

[FIG 35]
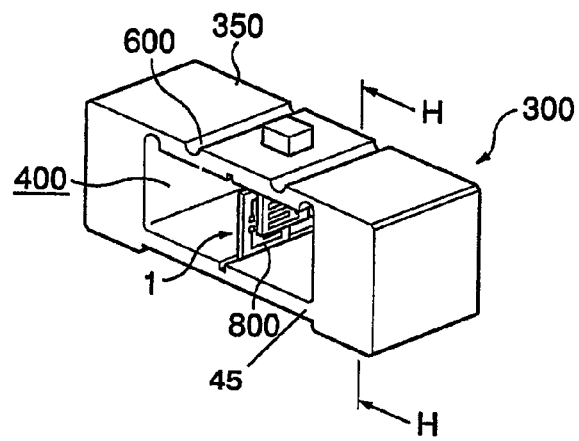
[FIG 36]
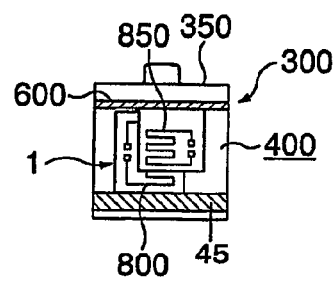
[FIG 37]
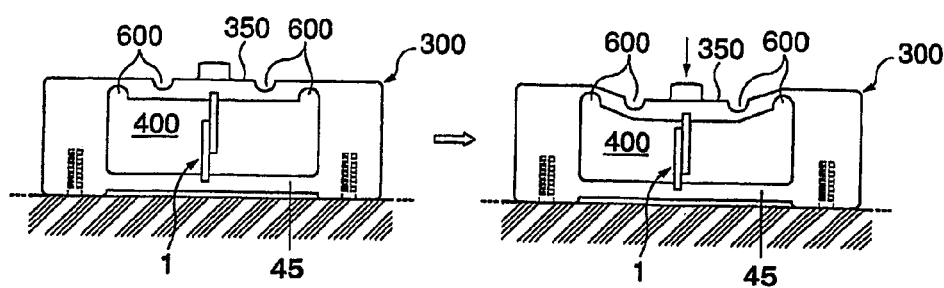

LOAD MEASURING TRANSDUCER INCLUDING ELASTIC STRUCTURE AND GAUGE USING INDUCED VOLTAGE, AND LOAD MEASURING SYSTEM USING THE SAME

FIELD OF THE INVENTION

The present invention relates to a load measuring transducer including an elastic structure and a gauge, and a load measuring system using the same. More particularly, the present invention relates to a load measuring transducer and system using the same, wherein load is applied to an elastically deformable structure to produce an elastic deformation in the structure and the applied load is then measured using a gauge in which an induced voltage is produced according to the produced elastic deformation.

TECHNICAL BACKGROUND

As a load measuring transducer generally employed in general-purpose electronic scales, industrial electronic scales and the like in the related art, there has been widely used a so-called "electric resistance type load cell" that employs a resistive wire constructing a strain gauge. In this load cell, when a strain is generated in a structure due to application of load to the structure, the strain is detected as a change in electric resistance of the resistive wire of the strain gauge and then converted into an electrical signal that in turn is measured, thereby measuring the applied load.

Load cells with accuracy as high as about between 1/3,000 and 1/5,000 are generally available. It is very difficult to implement a load cell with accuracy higher than the above accuracy. This is because there are problems in that a layer of an adhesive used to attach a strain gauge to a structure distorts and transfers a strain produced in the structure and also disturbs extension and compression behaviors of the structure. Further, since the adhesive is made of polymer and has an inhomogeneous amorphous structure, it has non-uniform mechanical properties that cannot be easily predicted.

Inherent features of a strain gauge itself also adversely affect the implementation of higher accuracy. This is because there is a problem in that a back plate which is made of polymer such as phenol or polyamide and placed below a resistive material of the strain gauge inhibits the transfer of a strain without distortion in the same manner as the layer of the adhesive.

Further, since it is difficult to achieve a uniform profile of the resistive material throughout the strain gauge, it is also difficult to obtain uniform deformation thereof proportional to a compressive or tensile strain of a structure.

Another prior technique for measuring load uses an electromagnetic force balancing type load measuring transducer. However, since this load measuring transducer employs a very complicated mechanical mechanism, the load measuring transducer is difficult to manufacture and is very expensive. In addition, there are electrical and spatial limitations on increase of electromagnetic force serving as balancing force for applied load. Further, since the complicated mechanical mechanism includes a lot of thin hinges, there are problems in that it is not suitable for measurement of heavy load and it is very vulnerable to external impact.

Due to the above difficulties or problems, such a load measuring transducer cannot be easily used in general-purpose commercial electronic scales or industrial electronic scales and also be restrictively used only in special-purpose electronic scales.

Furthermore, the load measuring transducer should be able to measure the applied load even when the load is applied eccentrically to a deformation-producing portion of the structure rather than at the center thereof.

DETAILED DESCRIPTION OF THE INVENTION

Accordingly, the present invention is conceived to solve the problems in the conventional load measuring transducer and system. An object of the present invention is to provide a load measuring transducer and system, which are more simplified in their structures and components and can measure load with higher accuracy.

Another object of the present invention is to provide a load measuring transducer and system, which include a gauge capable of correctly measuring load even when the load is eccentrically applied.

The load measuring transducer for achieving the above purpose of the present invention comprises a stationary gauge which is constructed of a plurality of repeated electric wire patterns with a predetermined pitch and has both ends to which AC electricity is applied; and a moving gauge which is provided to move in a longitudinal direction of the stationary gauge without contacting with the stationary gauge in response to the occurrence of the elastic deformation of the deformation-producing portion of the structure.

The term "longitudinal direction of the gauge" is intended to mean a direction along which patterns of the gauge are repeatedly arranged.

Preferably, the moving gauge is comprised of a plurality of repeated electric wire patterns with the same pitch as the stationary gauge.

Preferably, the moving gauge is configured to move within a range of ½ pitch of the stationary gauge.

Further, each of the patterns of the stationary and moving gauges may include a linearly extending first portion, a second portion extending perpendicularly to the first portion, a third portion extending perpendicularly to the second portion and parallel to the first portion, and a pattern-connecting portion extending perpendicularly to the third portion. That is, the stationary and moving gauges may be constructed of a series of zigzag patterns.

Furthermore, the stationary and moving gauges may be configured to have a zigzag pattern including a circular first portion, a circular second portion concentric with the first portion, and a linear portion for connecting the first and second portions.

According to this load measuring transducer, since the first and second portions in the gauge pattern are concentric with each other, the load measuring transducer can correctly measure load even when the load is applied to the structure in a slightly eccentric manner.

In such a case, the moving gauge is also preferably constructed of a plurality of repeated patterns with the same pitch as the stationary gauge.

Further, the moving gauge is preferably configured to move within a range of ½ pitch of the stationary gauge.

Furthermore, the moving gauge is preferably constructed of a plurality of repeated same patterns with the same pitch as the stationary gauge. It is also preferred that the moving gauge overlap not throughout but partially with the circular first and second portions of the stationary gauge formed to be concentric with each other.

The load measuring system of the present invention measures load applied to a structure including a deformation-producing portion that produces elastic deformation when the load is applied to the structure, and comprises a load measuring transducer including a stationary gauge which is constructed of repeated patterns with a predetermined pitch and to which AC electricity is applied, and a moving gauge which is provided to move in a longitudinal direction of the stationary gauge without contact therewith in response to the occurrence of the elastic deformation of the deformation-producing portion; and a calculation unit for calculating the magnitude of the load based on an induced voltage measured at the moving gauge. Preferably, the calculation unit is a microprocessor.

In this load measuring system, it is preferred that in some cases, the induced voltage is measured when a predetermined period of time lapses after the load is applied to the structure. The reason is that the induced voltage of the moving gauge converges to a certain value after a certain period of time lapses.

Further, to correctly measure load even when the load is applied to the structure in a slightly eccentric manner, the pattern of the gauges of the load measuring system may include a circular first portion, a circular second portion concentric with the first portion, and a linear portion for connecting the first and second portions.

A load measuring transducer according to another aspect of the present invention comprises a stationary gauge which is constructed of a plurality of repeated patterns with a predetermined pitch and has both ends to which AC electricity is applied; and a moving gauge which is provided to move in a direction perpendicular to a longitudinal direction of the stationary gauge without contact therewith in response to the occurrence of the elastic deformation of the deformation-producing portion.

According to this load measuring transducer, since the moving gauge moves in a direction perpendicular to the longitudinal direction of the gauge, the load can be measured without limitations on the moving distance of the moving gauge as compared to the previous load measuring transducer including the moving gauge which moves in the longitudinal direction of the gauge.

A load measuring system employing the above load measuring transducer comprises a load measuring transducer including a stationary gauge which is constructed of repeated patterns with a predetermined pitch and to which AC electricity is applied, and a moving gauge which is provided to move in a direction perpendicular to a longitudinal direction of the stationary gauge without contacting with the stationary gauge in response to the occurrence of the elastic deformation of the deformation-producing portion; and a calculation unit for calculating the magnitude of the load based on an induced voltage measured in the transducer.

In this load measuring system, it is also preferred that in some cases, the induced voltage is measured when a predetermined period of time lapses after the load is applied to the structure. The reason is that the induced voltage of the moving gauge converges to a certain value after a certain period of time lapses.

BRIEF DESCRIPTION OF THE DRAWINGS

The above and other objects and features of the present invention will become apparent from the following description of preferred embodiments given in conjunction with the accompanying drawings, in which:

FIG. 1 is a block diagram of a load measuring system according to the present invention;

FIG. 2 is a flowchart illustrating a load measuring method according to the present invention;

FIG. 3 is an exploded perspective view of a load measuring transducer mounted with a gauge according to an embodiment of the present invention;

FIG. 4 is an exploded perspective view of a load measuring transducer mounted with a gauge according to another embodiment of the present invention;

FIG. 5 is a sectional view of a structure to which the load measuring transducer shown in FIG. 3 is employed;

FIG. 6 is a sectional view of a structure to which the load measuring transducer shown in FIG. 4 is employed;

FIG. 7 a sectional view showing a state where upon the application of load to the structure shown in FIGS. 5 and 6, elastic deformation has occurred in the structure;

FIG. 8 is a conceptual plan view showing an example of the gauge of the present invention;

FIG. 9 is a conceptual plan view showing an example of the gauge of the present invention, which can correctly measure load even when the eccentric load is applied to the structure;

FIG. 10 is a conceptual perspective view of the gauge shown in FIG. 8, showing a state where a moving gauge has been moved in the longitudinal direction of the gauge by a predetermined elastic deformation within a range of ¼ (or ½) pitch without contact due to the occurrence of elastic deformation in the structure;

FIG. 11 is a conceptual perspective view of the gauge shown in FIG. 9, showing a state where a moving gauge has been moved in the longitudinal direction of the gauge by a predetermined elastic deformation within a range of ¼ (or ½) pitch without contact due to the occurrence of elastic deformation in the structure;

FIG. 12 is a conceptual perspective view of a gauge according to another embodiment of the present invention, showing a state where a moving gauge has been moved in a direction perpendicular to the longitudinal direction of the gauge by a predetermined elastic deformation without contact due to the occurrence of elastic deformation in the structure;

FIG. 13 is a graph conceptually showing changes in an output induced voltage due to the application of load when a load measuring transducer of the present invention is operated; and FIGS. 14 to 37 are views showing states where a gauge is mounted to each of structures equipped with the load measuring transducer according to various embodiments of the present invention and elastic deformation occurs in the structure when load is applied to the structure.

PREFERRED EMBODIMENTS

Hereinafter, preferred embodiments of the present invention will be described in detail with reference to the accompanying drawings.

FIG. 1 shows an example of a load measuring system for measuring load using a gauge ("IPA gauge") according to the present invention. As shown in FIG. 1, the load measuring system of the present invention comprises an oscillator unit 31, an AC electricity-applying unit 33, an IPA gauge 1, an amplifier 11, an AC/DC converter 12, an active filter 13, an A/D converter 14 and a calculation unit 15. The term "IPA gauge" used herein is an abbreviation of "Inductance Pattern Analogue Gauge" which is operated in such a manner that an induced voltage generated in a moving gauge on one side as the moving gauge is moved with respect to a stationary gauge on the other side to which AC electricity is applied is continuously measured, thereby measuring applied load in real time, or in such a manner that the induced voltage is not continuously measured with time but is measured after a lapse of a predetermined period of time in order to measure applied load independently upon a moving path of the moving gauge.

The oscillator unit 31 includes a high frequency oscillation circuit, and an AC signal generated by the oscillation unit 31 is applied to the AC electricity-applying unit 33 that in turn amplifies the AC signal to have a predetermined level of voltage. The AC electricity-applying unit 33 applies the amplified AC signal to the IPA gauge 1. The IPA gauge 1 comprises a stationary gauge 800 and a moving gauge 850 that can move without contact with respect to the stationary gauge 800. The detailed structure of the IPA gauge 1 will be described with reference to FIGS. 8 to 12.

As shown in FIGS. 8, 10 and 12, the linear IPA gauge 1 comprises the stationary gauge 800 and the moving gauge 850 that is arranged to move without contacting with respect to the stationary gauge 800. In practice, the stationary and moving gauges 800 and 850 are formed on respective flat plates. However, for the sake of simplicity of illustration, the plates are not shown in the figures.

The stationary and moving gauges 800 and 850 are formed to have repeated wire patterns, respectively. Each pattern comprises a linearly extending first portion 810, a second portion 820 extending from an end of the first portion 810 in a direction perpendicular thereto, and a third portion 830 extending from an end of the second portion 820 in a direction perpendicular to the second portion 820 and in parallel to the first portion 810. Such patterns are repeatedly arranged, and a portion for connecting adjacent two patterns to each other extends perpendicularly to the third portion 830 to connect the patterns.

Each of the stationary and moving gauges 800 and 850 has a pitch P between adjacent patterns. Preferably, their pitches are the same as each other.

Meanwhile, as shown in FIGS. 8 and 12, the moving gauge 850 is initially juxtaposed with respect to the stationary gauge 800.

As shown in FIGS. 9 and 11, the circular IPA gauge 1 of the present invention comprises the stationary gauge 800 and the moving gauge 850 that is arranged to move without contacting with respect to the stationary gauge 800. In practice, the stationary and moving gauges 800 and 850 are formed on respective flat plates. However, for the sake of simplicity of illustration, the plates are not shown in the figures.

The stationary and moving gauges 800 and 850 are formed to have repeated wire patterns, respectively. Each pattern comprises a circular first portion 810, a circular second portion 830 concentric with the first portion 810, and a linear portion 820 for connecting the first and second portions 810 and 830. Such patterns are extended and connected with each other by means of the linear portion.

Each of the stationary and moving gauges 800 and 850 has a pitch P between adjacent patterns. Preferably, their pitches are the same as each other. Further, the moving gauge 850 overlaps not throughout but partially with the stationary gauge 800, as shown in FIGS. 9 and 11.

Furthermore, the moving gauge 850 is initially juxtaposed with respect to the stationary gauge 800.

According to the circular IPA gauge of the present invention, the stationary gauge 800 is composed of the first and second portions 810 and 830 formed in a concentric fashion.

Moreover, the moving gauge 850 is also configured to have the same pitch and pattern as the stationary gauge 800 and overlaps partially with the stationary gauge 800. Therefore, the circular IPA gauge can be used to easily measure load even when the load is applied to the structure in an eccentric manner.

FIG. 10 shows a state where the moving gauge 850 of the IPA gauge shown in FIG. 8 has been moved in the longitudinal direction of the gauge by ¼ pitch due to the occurrence of elastic deformation in the structure. When the moving gauge 850 is moved with respect to the stationary gauge 800 in such a manner, an induced voltage is generated between ends of the moving gauge 850 and the generated voltage signal is applied to and amplified by the amplifier 11. The amplifier 11 is generally an operational amplifier that preferably performs differential amplification.

FIG. 11 shows a state where the moving gauge 850 of the circular IPA gauge shown in FIG. 9 has been moved in the longitudinal direction of the gauge by ¼ pitch due to the occurrence of elastic deformation in the structure. When the moving gauge 850 is moved with respect to the stationary gauge 800 in such a manner, induced voltage is generated between the ends of the moving gauge 850 and the generated voltage signal is applied to and amplified by the amplifier 11. The amplifier 11 is generally an operational amplifier that preferably performs differential amplification.

Meanwhile, according to the present invention, the moving gauge 850 may be moved in a direction perpendicular to the longitudinal direction of the gauge, as shown in FIG. 12. According to this embodiment of the present invention, since the moving gauge 850 is moved in a direction perpendicular to the longitudinal direction of the gauge, there is an advantage in that the load can be measured without limitation on the moving distance of the moving gauge 850 as compared to the previous embodiment in which the moving gauge 850 is moved in the longitudinal direction thereof.

FIG. 5 is sectional view showing a case where the IPA gauge 1 according to the embodiment in which the moving gauge 850 is moved in the longitudinal direction of the gauge as shown in FIG. 10 is mounted on the structure 30. FIG. 6 is a sectional view showing a state the IPA gauge 1 according to the other embodiment in which the moving gauge 850 is moved in the direction perpendicular to the longitudinal direction in the gauge as shown in FIG. 12 is mounted on the structure. In the above two embodiments, the moving gauge 850 is moved depending on deformation of a deformation-producing portion 35, which is produced when load is applied to the structure 30. Then, a value corresponding to a change in the induced voltage generated in the moving gauge 850 due to the movement thereof is measured. Therefore, the applied load can be measured.

FIG. 13 shows a graph of the output voltage induced at the moving gauge 850 versus time in a general case where load is applied to the structure by means of an object. As shown in the graph of FIG. 13, the magnitude of the voltage induced at the moving gauge 850 slightly fluctuates and then converges to a certain value. To measure the converged voltage value, it is preferred to measure a voltage Vout after a lapse of a predetermined period of time Δt.

Meanwhile, the electric signal that is induced at the IPA gauge 1 and then provided through the amplifier 11 is an AC signal. The AC/DC convert 12 is provided as a means for converting the AC signal into a DC signal.

The electric signal converted into the DC signal passes through an active filter 24 so that undesired components such as surge signals can be filtered out. After effective optimal signal is thus secured, this signal is then converted into a digital signal by the A/D converter 14. The obtained digital signal is finally input into the calculation unit 15 that in turn calculates the magnitude of load applied to the structure 30 from the digital signal based on the voltage signal induced at the moving gauge 850.

It is preferred that the calculation unit 15 be implemented with a microprocessor which enables the calculated magnitude of load to be displayed on a display or the like. In addition, conventional input means may be used to input configuration values, setup information and factors, communication messages, timer parameters or the like into the microprocessor.

FIG. 2 is a flowchart illustrating a load measuring method according to the present invention.

When load is applied to a structure (step S200), the structure is then deformed (step S210). The deformation of the moving gauge 850 in the IPA gauge 1 occurs depending on the amount of deformation of the structure. This causes a change in an induced voltage at the moving gauge 850 due to its relationship with the stationary gauge 800 (step S220).

AC electricity generated by the oscillator unit 31 is applied to the stationary gauge 800 of the IPA gauge 1 by the AC electricity-applying unit 33. With the occurrence of the deformation in the structure, the moving gauge 850 is moved with respect to the stationary gauge 800 without contact, resulting in the occurrence of a change in the induced voltage due to an electromagnetic induction phenomenon.

The obtained value of the change in the induced voltage is differentially amplified by the amplifier 11 (step S230). Thereafter, the conversion of an AC signal into a DC signal is performed, if necessary (step S240). Then, any surge signals are filtered out (step S250), the conversion of an analogue signal into a digital signal is performed (step S260), and the digital signal is processed to accurately calculate the applied load by the calculation unit, i.e. microprocessor 15 (step S270). The processed signal, i.e. load, is displayed on the display (step S280).

The microprocessor 15 performs signal processing and calculation, and compensation operations such as key input, storage of setup information and factors, communications and input of time. The communications may be made by properly configuring a unidirectional or bidirectional communication scheme.

FIGS. 3 to 7 and FIGS. 14 to 37 are perspective views and sectional views showing states where the IPA gauge 1 of the present invention is mounted on each of structures 30 according to various embodiments of the present invention and the elastic deformation of the deformation-producing portion 35 occurs in each structure 30 when load is applied to the structure 30. Although these figures are mainly related to the embodiment in which the moving gauge 850 is moved as shown in FIGS. 10 and 11, the other embodiment in which the moving gauge 850 is moved as shown in FIG. 12 also has a sectional configuration similar to that of FIGS. 10 and 11, except that the IPA gauge 1 is mounted on the structure as shown in FIGS. 4 and 6.

FIGS. 3 to 7 show the most basic embodiments in which the structure 30 that is a cylindrical member is formed with a hollow portion 40 therein and an upper part of the structure 30 comprises the deformation-producing portion 35 including a central axis (vertical axis).

It is preferred that the structure 30 be constructed to have a projection at the center of the deformation-producing portion 35 so that load can be applied directly to the projection. The deformation-producing portion 35 is a portion that is deformed to produce deformation in proportion to load applied thereto. The amount of deformation of the deformation-producing portion 35 is transferred to the moving gauge 850 of the IPA gauge. The movement of the moving gauge 850 generates an induced voltage to be output. The induced voltage is processed through the aforementioned procedure and thus the applied load is obtained.

The structure 30 may have a detachable bottom portion 45. When the bottom portion 45 of the structure 30 is constructed as such, a hollow portion 40 can be isolated from the outside.

The deformation-producing portion 35 is a thin elastic body which is preferably constructed such that a central portion thereof protrudes with respect to a peripheral portion thereof to facilitate the occurrence of the deformation due to the applied load.

In order to more effectively produce the deformation due to the applied load as compared with the structure 30 shown in FIGS. 3 and 4, the deformation-producing portion 35 can be further formed with a deformation-inducing groove 60 as shown in FIG. 14.

Preferably, as shown in FIGS. 14 to 19, the deformation-inducing groove 60 takes the shape of a circular depression about the central axis on a top or bottom surface of the deformation-producing portion 35, i.e. a continuous groove depressed along a circumference with a predetermined radius centered on the central axis. Owing to the deformation-inducing groove 60, the deformation-producing portion 35 can be more easily manufactured and/or machined, and the effects of allowing the elastic deformation induced by the load to move the moving gauge 850 in a direction of the central axis can also be further enhanced.

Alternatively, there may be employed an even number of concentric deformation-inducing grooves 60 with different diameters. Referring to FIGS. 14 to 19, there are shown examples of the structures 30 provided with the deformation-inducing groove or grooves 60. When the load is applied to the structure, the structure 30 is fixed by means of fixing members 50.

The IPA gauge 1 converts the amount of deformation, which is produced due to the deformation of the structure, into the amount of change in the induced voltage corresponding thereto and then outputs the amount of change. The moving gauge 850 is mounted on the bottom surface of the deformation-producing portion 35 of the structure 30, and the stationary gauge 800 is placed to face the moving gauge 850 and fixed to the bottom portion 45.

If the moving gauge 850 mounted on the bottom surface of deformation-producing portion 35 of the structure 30 is moved downward due to the deformation of the deformation-producing portion 35, induction effects between the moving gauge and the stationary gauge 800 to which the AC electricity is applied result in a changed induced voltage Vout at the moving gauge 850.

Here, the moving gauge 850 of the IPA gauge 1 is connected to a circuit including the amplifier 11 and the like, and the output induced voltage Vout signal is processed through the aforementioned procedure. Therefore, the applied load is calculated based on the processing and then displayed.

According to the present invention, the load applied to the deformation-producing portion 35 can be transferred, without any distortion of the load, directly to the IPA gauge 1 as a conversion means. Further, since the output induced voltage can be increased by increasing an AC frequency of the oscillator unit 31, it is possible to remarkably enhance load measurement accuracy as compared with a method using a conventional load cell.

To this end, it is preferred that among the two flat plates constituting the IPA gauge 1, the upper flat plate formed with the moving gauge 850 be arranged to be aligned with the central axis of the deformation-producing portion 35 of the structure and the other lower flat plate formed with the stationary gauge 800 be arranged in parallel to the upper flat plate.

In such a configuration, vertical load (designated by an arrow in the figures) applied to the center of the deformation-producing portion 35 can be accurately transferred directly to the IPA gauge 1. Thus, based on the transferred deformation, the IPA gauge 1 can obtain an accurate induced voltage corresponding to the amount of elastic deformation of the structure 30 due to the load applied thereto, i.e. the amount of deformation of the deformation-producing portion 35. Particularly, according to the present invention, it is possible to essentially prevent a possibility that a distortion phenomenon will occur when the deformation and resultant deformation of the deformation-producing portion 35 is transferred. Therefore, the problems in the prior art do not occur originally.

Further, the constitutional feature of the present invention is to provide an advantage in that mechanisms for the application of load to the structure and the transfer of the amount of deformation are very simply constructed. Thus, the present invention is more advantageous than the prior art in view of accuracy as well as costs and producibility. Moreover, since the present invention easily overcomes vulnerability to heavier load or impact, the present invention can be widely used as simple scales and reliable load measuring systems in a variety of outdoor industrial sites.

FIGS. 20 to 28 show a structure 30 and its variants according to another embodiment of the present invention.

The structure 30 is constructed such that some portions of the deformation-producing portion 35 are removed to cause the inner hollow portion 40 to communicate with the outside through the removed portions thereof.

Such a structure 30 may also be formed with the deformation-inducing groove 60 for effectively inducing the deformation of the structure 30. FIGS. 23 to 28 show examples of the structures 30 with the deformation inducing groove or grooves 60. Since the methods of inducing the elastic deformation in and measuring the load in the structures 30 shown in FIGS. 20 to 28 are substantially the same as those in the previous embodiments described above and their effects are also the same as each other, a detailed description thereof will be omitted.

FIGS. 29 to 37 show a structure 30 and its variants according a further embodiment of the present invention. The structure 30 generally takes the shape of a rectangular parallelepiped of which one side is partially removed and which has an inner hollow portion 40.

This embodiment also includes the IPA gauge 1 for converting the amount of deformation in the structure 30 caused due to applied load into an electric signal corresponding thereto.

Since deformation and deformation-inducing mechanisms and load measuring methods for the structures 30 shown in FIGS. 29 to 37 are the substantially same as the previous embodiment described above and their effects are also the same as each other, a detailed description thereof will be omitted.

In the meantime, although it is merely illustrated in FIGS. 3, 5, and 14 to 37 that the IPA gauge 1 is shaped as a linear type, the circular IPA gauge may be substituted for the linear IPA gauge. The circular IPA gauge so configured can achieve an advantage of being able to be applied to a case where the load is applied to the structure in an eccentric manner. Although it is not illustrated in these figures, a method of inducing elastic deformation, a method of measuring load, a configuration of installing the structure and an arrangement of the gauges according to the embodiment in which the circular IPA gauge is employed are substantially the same as those in the previous embodiment described above and their effects are also the same as each other, a detailed description thereof will be omitted.

INDUSTRIAL APPLICABILITY

According to the load measuring system, load measuring transducer and load measuring method of the present invention wherein the applied load can be measured either in real time by inducing elastic deformation in the structure due to applied load using a variety of simple structures and continuously measuring an accurate induced voltage corresponding to elastic deformation without any distortion using a simple component or independent of a moving path by measuring the induced voltage in some cases after a predetermined period of time lapses, the following advantages can be obtained.

First, since a component that disturbs or distorts behaviors of the structure, is not uniform and cannot be correctly predicted is essentially and originally removed, there is an advantage in that higher accuracy can be implemented.

Second, since simplified structures and components are employed, there is another advantage in that low production costs can be achieved.

Third, there is a further advantage in that the present invention can be variously applied within a wide range of light load to heavy load (above several tons) according to the structure and gauge design.

Fourth, since a transducer operating relatively well under the severe conditions or environments in which external impact is produced can be implemented according to the structure design, there is a still further advantage in that the present invention can be used as a reliable load measuring system not only for simple scales but also in a variety of outdoor industrial fields.

Fifth, since the transducer can be implemented to have various sizes and also to have a very small size according to the structure and gauge design, there is a still further advantage in that the present invention can be widely applied to various fields.

Sixth, since the circular IPA gauge is configured in such a manner that each of the patterns of the stationary and moving gauges 800 and 850 includes the first and second portions 810 and 830 formed along the concentric circular arcs, it is possible to easily overcome an eccentrically loading phenomenon.

Although the present invention has been described in connection with the embodiments illustrated in the accompanying drawings, the scope of the present invention is defined by the appended claims and it should not be construed as being limited to the embodiments.

It should be understood that various substitutions, modifications and changes obvious to those skilled in the art and made without departing from the spirit of the present invention will fall within the scope of the present invention.

The invention claimed is:

1. A load measuring transducer for measuring load applied to a structure including a deformation-producing portion that produces elastic deformation when the load is applied to the structure, comprising:

a stationary gauge which is constructed of a wire patterns having a longitudinal direction with a predetermined pitch and which has both ends to which AC electricity is applied; and a moving gauge which is provided to move in the longitudinal direction with respect to the wire pattern of the stationary gauge without contact with the stationary gauge in response to the occurrence of elastic deformation of the deformation-producing portion, wherein the load applied to the structure is measured by sensing an induced voltage between the stationary gauge and the moving gauge.

2. The load measuring transducer as claimed in claim 1, wherein the moving gauge is constructed of wire patterns with the same pitch as the stationary gauge.

3. The load measuring transducer as claimed in claim 1, wherein the wire patterns takes the shape of a zigzag including a linearly extending first portion, a second portion extending perpendicularly to the first portion, a third portion extending perpendicularly to the second portion and parallel to the first portion, and a pattern-connecting portion extending perpendicularly to the third portion.

4. The load measuring transducer as claimed in claim 1, wherein the wire patterns takes the shape of a zigzag including a circular first portion, a circular second portion concentric with the first portion, and a linear pattern-connecting portion for connecting the first and second portions.

5. The load measuring transducer as claimed in claim 1, wherein the moving gauge can move within a range of 1/2 pattern pitch of the stationary gauge.

6. The load measuring transducer as claimed in claim 1, wherein the pattern of the moving gauge is arranged to overlap partially with the pattern of the stationary gauge.

7. A load measuring system for measuring a load applied to a structure including a deformation-producing portion that produces deformation when the load is applied to the structure, comprising:

a load measuring transducer including a stationary gauge which is constructed with a wire patterns having a longitudinal direction with a predetermined pitch and to which AC electricity is applied, and a moving gauge which moves in the longitudinal direction with respect to the wire pattern without contacting said stationary gauge in response to the elastic deformation of the deformation-producing portion, wherein the movement of the moving gauge generates an induced voltage between the moving gauge and the stationary gauge; and a calculation unit for calculating the magnitude of the load based on an induced voltage output from the moving gauge of the transducer.

8. A load measuring transducer for measuring a load applied to a structure including a deformation-producing portion that produces elastic deformation when the load is applied to the structure, comprising:

a stationary gauge which is constructed with a wire pattern having a longitudinal direction with a predetermined pitch and to which AC electricity is applied; and a moving gauge which moves in a direction perpendicular to the longitudinal direction with respect to the wire patterns of the stationary gauge without contacting said stationary gauge in response to the of elastic deformation of the deformation-producing portion, wherein the load applied to the structure is measured by sensing an induced voltage between the stationary gauge and the moving gauge.

9. A load measuring system for measuring a load applied to a structure including a deformation-producing portion that produces elastic deformation when the load is applied to the structure, comprising:

a load measuring transducer including a stationary gauge which is constructed with a wire patterns having a longitudinal direction with a predetermined pitch and to which AC electricity is applied, and a moving gauge which moves in a direction perpendicular to the longitudinal direction with respect to the wire pattern of the stationary gauge without contacting said gauge in response to the occurrence of elastic deformation of the deformation-producing portion; wherein the movement of the moving gauge generates an induced voltage between the moving gauge and the stationary gauge; and a calculation unit for calculating the magnitude of the load based on an induced voltage output from the moving gauge of the transducer.

10. The system as claimed in claim 7, wherein the induced voltage is measured when a predetermined period of time elapses after the load is applied to the structure.

11. The transducer as claimed in claim 1, wherein the structure is cylindrical with a hollow interior portion, a side surface and a deformation-producing portion at an upper surface thereof.

12. The transducer as claimed in claim 11, wherein the hollow interior portion of the structure communicates with the outside of the structure by removing a part of the deformation-producing portion or by removing a part of a side surface of the structure.

13. The transducer as claimed in claim 1, wherein the structure is in the shape of a rectangular parallelepiped with a hollow portion at the interior thereof and a deformation-producing portion at an upper surface thereof, and a side surface of the structure has an opening to provide communication between the hollow portion and the outside.

14. The transducer as claimed in claim 1, wherein the deformation-producing portion is formed with at least one deformation-inducing groove.

15. The load measuring transducer as claimed in claim 2, wherein the wiring pattern takes the shape of a zigzag including a linearly extending first portion, a second portion extending perpendicularly to the first portion, a third portion extending perpendicularly to the second portion and parallel to the first port on, and a pattern-connecting portion extending perpendicularly to the third portion.

16. The load measuring transducer as claimed in claim 2, wherein the wiring patterns takes the shape of a zigzag including a circular first portion, a circular second portion concentric with the first portion, and a linear pattern-connecting portion for connecting the first and second portions.

17. The load measuring transducer as claimed in claim 2, wherein the pattern of the moving gauge is ranged to overlap partially with the pattern of the stationary gauge.

18. The load measuring transducer as claimed in claim 4, wherein the pattern of the moving gauge is arranged to overlap partially with the pattern of the stationary gauge.

19. The system as claimed in claim 9, wherein the induced voltage is measured when a predetermined period of time elapses after the load is applied to the structure.

20. The transducer as claimed in claim 8, wherein the structure is cylindrical with a hollow interior portion and a deformation-producing portion at an upper surface thereof.

21. The load measuring transducer as claimed in claim 8, wherein the structure is in the shape of a rectangular parallelepiped with a hollow portion at the interior thereof and a deformation-producing portion at an upper surface thereof, and a side surface of the structure has an opening to provide communication between the hollow portion and the outside.

22. The load measuring transducer as claimed in claim 8, wherein the deformation-producing portion is formed with at least one deformation-inducing groove.

* * * * *

UNITED STATES PATENT AND TRADEMARK OFFICE
CERTIFICATE OF CORRECTION

PATENT NO. : 7,258,028 B2  Page 1 of 1
APPLICATION NO. : 10/537403
DATED : August 21, 2007
INVENTOR(S) : Heung Park It is certified that error appears in the above-identified patent and that said Letters Patent is hereby corrected as shown below:

On the title page of the Letters Patent,

Under section (76) Inventor:, change "Hueng Joon Park, 103-1601 Hanshin apt., Jookjeon, Yongin-shi, Gyunggi-do 449-160 (KR)" to -- Heung Joon Park, Gyunggi-do, Korea, Republic of --.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,258,028 B2
APPLICATION NO. : 10/537403
DATED : August 21, 2007
INVENTOR(S) : Heung Park It is certified that error appears in the above-identified patent and that said Letters Patent is hereby corrected as shown below:

On the title page of the Letters Patent,

Under section (76) Inventor:, change "Hueng Joon Park, 103-1601 Hanshin apt., Jookjeon, Yongin-shi, Gyunggi-do 449-160 (KR)" to -- Heung Joon Park, Gyunggi-do, Korea, Republic of --

Signed and Sealed this

Twenty-fifth Day of December, 2007

JON W. DUDAS
*Director of the United States Patent and Trademark Office*